Oct. 10, 1961 G. T. LYON 3,003,795
TUBE COUPLING HAVING A RESILIENT METAL SEALING SLEEVE
Filed Aug. 12, 1959 6 Sheets-Sheet 4

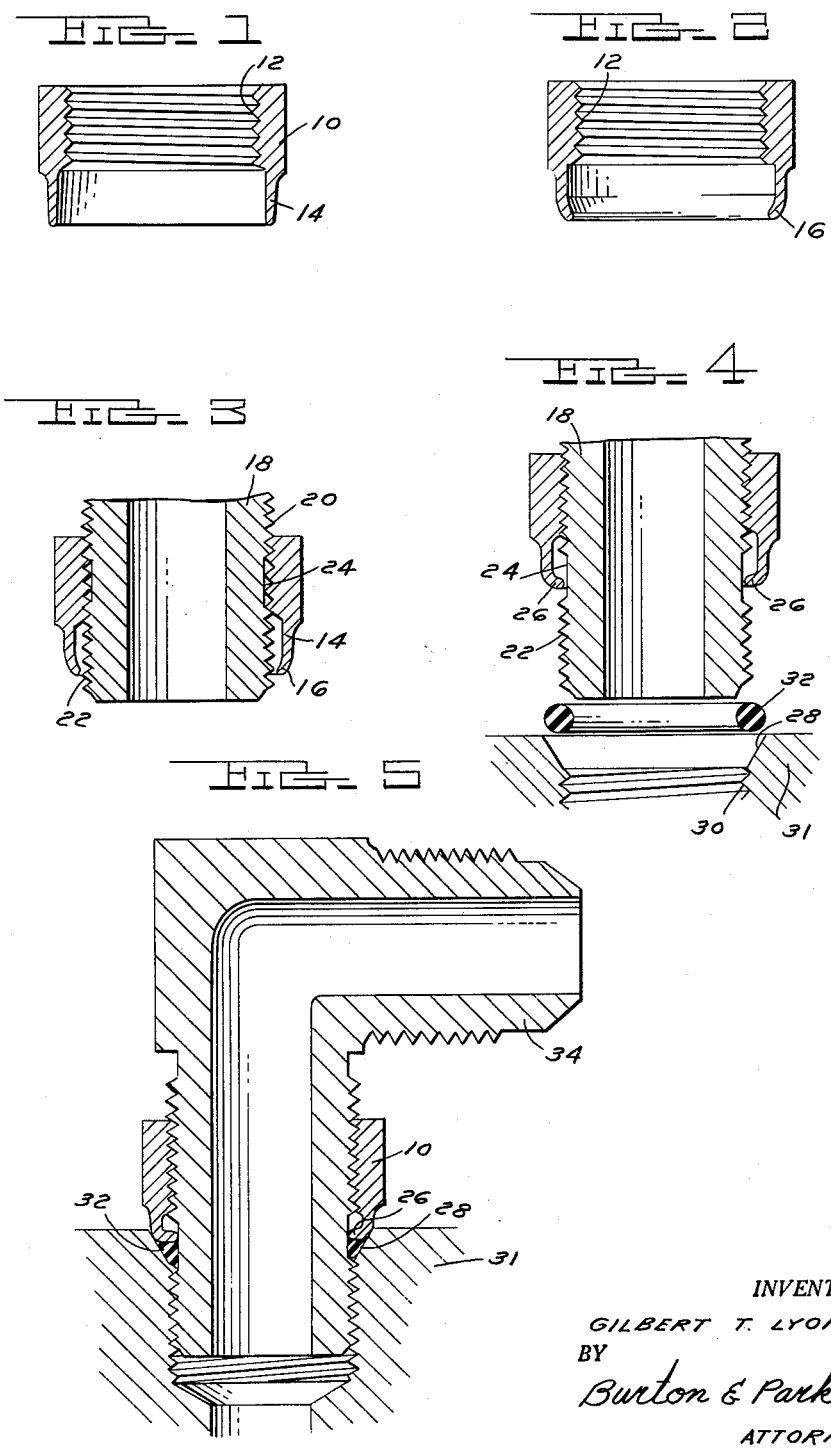

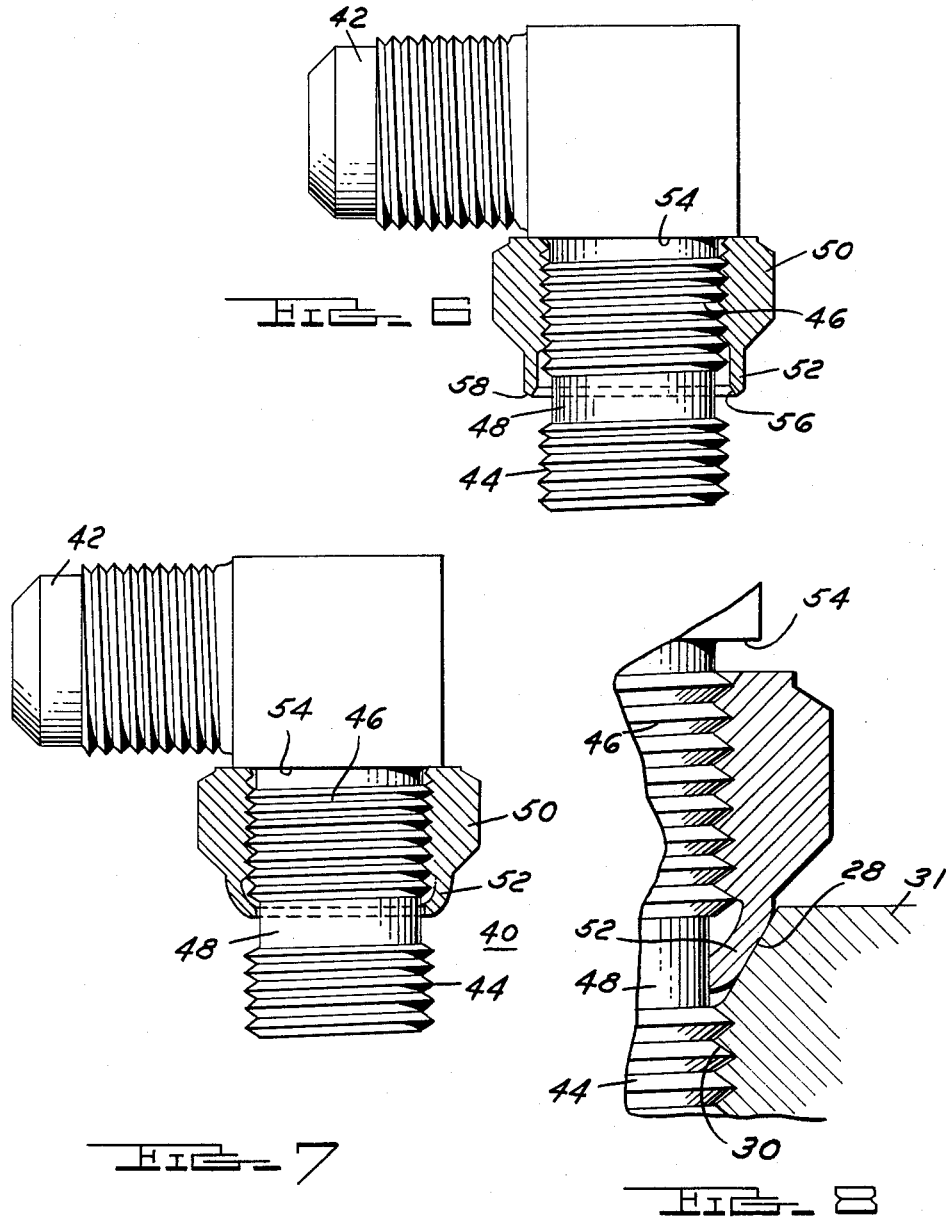

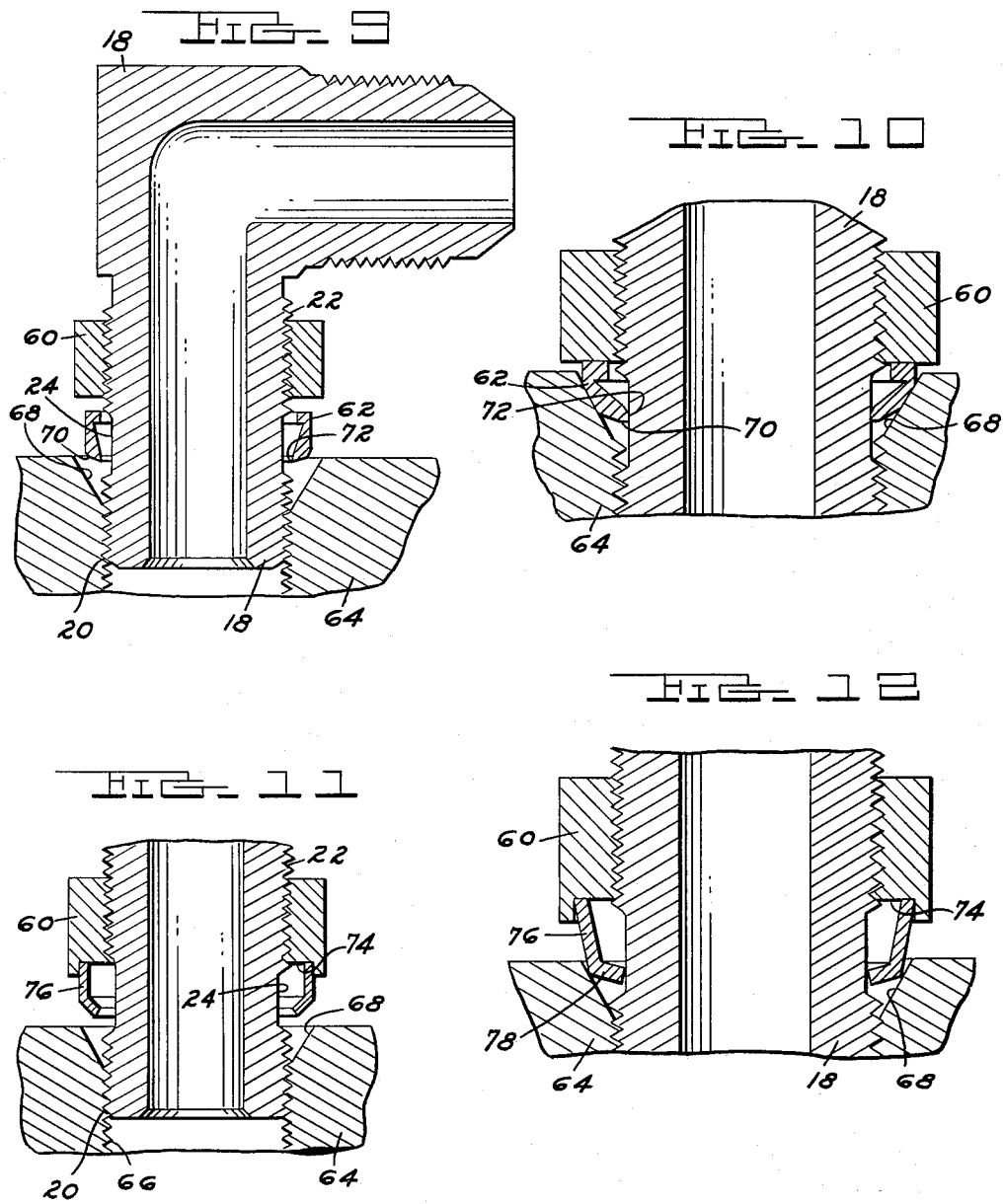

INVENTOR.
GILBERT T. LYON
BY
*Burton & Parker*
ATTORNEYS

Oct. 10, 1961          G. T. LYON          3,003,795
TUBE COUPLING HAVING A RESILIENT METAL SEALING SLEEVE

Filed Aug. 12, 1959          6 Sheets—Sheet 6

INVENTOR.
GILBERT T. LYON
BY
Burton & Parker
ATTORNEYS

United States Patent Office 3,003,795
Patented Oct. 10, 1961

3,003,795
TUBE COUPLING HAVING A RESILIENT
METAL SEALING SLEEVE
Gilbert T. Lyon, Royal Oak, Mich., assignor to L & L
Manufacturing Company, Warren, Mich., a corporation of Michigan
Filed Aug. 12, 1959, Ser. No. 833,239
12 Claims. (Cl. 285—212)

This invention relates to improvements in couplings or fittings for fluid pressure systems and particularly to high pressure systems.

The fitting of this invention is adapted to be threaded into a port designed to receive the same. The fitting includes a lock nut assembly which is mounted thereon. The nut assembly includes a nut portion and a sleeve portion. Following threading of the fitting into the port and upon threading of the nut portion down about the fitting, the sleeve portion functions to effect an hermetic seal between the beveled entrance to the port and a surface of the fitting.

One object of the invention is the provision of an assembly comprising: a tubular fitting externally threaded at one end to be received within an internally threaded port, which port has a tapered unthreaded enrtance; a lock nut portion threaded upon the fitting, and a sleeve portion disposed forwardly of the lock nut portion. Such sleeve may be either integral with the nut or separate therefrom. The sleeve encircles the fitting and is spaced radially therefrom. The forward end of the sleeve is swaged inwardly toward the fitting and so constricted thereabout as to be wedged between the fitting and the tapered entrance to the port so as to form a fluid-tight seal therebetween.

An important feature is the provision of a fitting including a nut and sleeve assembly as hereinabove described, wherein the fitting is provided with two externally threaded lengths axially spaced apart by an unthreaded length. One threaded length, termed the inner threaded length, is adjacent to the forward extremity of the fitting and is received within the port. The other threaded length, termed the outer threaded length, is spaced outwardly upon the fitting from the inner threaded length by an unthreaded length. Such outer threaded length threadedly receives the nut. The unthreaded length is of less diameter than the inner threaded length.

The nut and sleeve assembly comprises a nut part threaded upon the outer threaded length of the fitting, and a circumferentially continuous sleeve part being in the form of an axially outwardly opening lip as it extends inwardly of the nut part and which encircles the unthreaded portion of the fitting. This sleeve portion may be integral with or separate from the nut portion. This sleeve portion has its inner end inturned and swaged inwardly over the beveled entrance to the port toward the unthreaded length of the fitting. Such inner end extends and is wedged between the beveled entrance to the port and the unthreaded length of the fitting forming a fluid-tight seal therebetween. So swaged, the sleeve portion is somewhat cup-shaped, having an internal diameter at its inner end substantially less than the internal diameter at its outer end. Preferably the inner end of the sleeve is swaged to an internal diameter less than the external diameter of the inner threaded length of the fitting prior to putting the same into use, thereby holding the sleeve and nut captive on the fitting. Such initial swaging is accomplished with a tool.

Following threading of the fitting into the port and upon threading of the nut over the fitting, the inner end of the sleeve is swaged over the beveled entrance to the port so that its external circumferential face portion is urged to seat and seal continuously circumferentially around the beveled entrance to the port and its internal circumferential face portion is urged toward the unthreaded length of the fitting to seat and seal continuously circumferentially therearound, forming an effective fluid-tight seal extending between the unthreaded length of the fitting and the beveled wall of the port.

An important object is that, when the fitting is put into use, the inner end of the sleeve is so formed and so extends between the beveled entrance to the port and the unthreaded length of the fitting that if there is leakage of fluid from the ported member between the threads of the fitting and the threaded port of the member and into the space between the beveled entrance to the port and the fitting, such fluid pressure wedges the inner end of the sleeve more tightly into sealing engagement between the beveled wall of the port and the unthreaded length of the fitting.

An important feature is that the sleeve possesses such resiliency that when the nut is backed off and the pressure upon the sleeve is released, the inner end of the sleeve will spring back away from the unthreaded length of the fitting thereby facilitating removal and re-use of the fitting assembly within another member and/or adjustment of the fitting within the port of the same member and/or adjustment of the nut upon the fitting.

Another meritorious feature is the provision of an assembly as described wherein the face of the inner end of the sleeve so engages the unthreaded length of the fitting as to exert a burnishing action thereupon during assembly. As such inner end wipes over the unthreaded portion of the fitting it tends to smooth out small machining imperfections therein and increase the effectiveness of the seal.

A further meritorious feature is that the inner end of the sleeve is so formed, in one embodiment, as to present an external continuous circumferential arcuate face to the beveled entrance to the port to seal thereagainst and to present an internal continuous circumferential arcuate face to the unthreaded length of the fitting to seal thereagainst. Such internal and/or external circumferential faces of the inner end of the sleeve which contact the unthreaded length of the fitting or the beveled entrance to the port may present flat rather than arcuate faces thereto.

Another object is the provision of a fitting of the character described wherein, in one embodiment, the lock nut and sleeve is a one-piece assembly. The nut portion is threaded upon the fitting. The sleeve portion projects forwardly from the nut over the fitting. The forward end of the sleeve is urged by the nut against the beveled entrance to the port and inturned into sealing contact with the fitting.

Another object is the provision of a fitting as described wherein, in another embodiment, the sleeve portion is formed separate from the nut portion and may be passed freely over the inner threaded length of the fitting into abutment with an end of the nut. The inner end of the sleeve is swaged inwardly about the unthreaded length of the fitting and to a less diameter than a threaded length as heretofore described.

When the fitting assembly is put into use, the forward end of the sleeve is further swaged as the nut is threaded down over the fitting, and a tight seal is formed. The pre-swaging of the lip end of the sleeve by the tool renders the sleeve more readily responsive to be subsequently swaged into sealing engagement between the beveled entrance to the port and the unthreaded length of the fitting.

This application is a continuation-in-part of my application Serial No. 590,745, filed June 11, 1956, now abandoned, which in turn was a continuation-in-part of application Serial No. 490,563, filed February 25, 1955, now abandoned, and includes material taken from application Serial No. 508,419 filed May 16, 1955, now abandoned and consolidated herein.

Other objects, advantages, and meritorious features will more fully appear from the following specification, appended claims, and accompanying drawings, wherein:

FIG. 1 is a cross sectional view through a one-piece embodiment of my improved nut and sleeve before the lip portion of the sleeve is inturned;

FIG. 2 is a cross sectional view similar to FIG. 1 but showing the lip of the sleeve slightly inturned;

FIG. 3 is a cross sectional view through the nut and sleeve assembly shown in FIG. 2 showing the same in the process of being passed over the inner threaded length of the fitting;

FIG. 4 is a cross sectional view of the nut assembly of FIG. 3 mounted on the outer threaded length of the fitting with the inner end of the sleeve inturned and swaged about the unthreaded length of the fitting to a captive nut position but prior to the threaded engagement of the fitting within a port of a member.

FIG. 5 is a cross sectional view showing the fitting of FIG. 4 mounted within a port with my improved nut and sleeve assembly sealing the fitting within the port;

FIG. 6 is a cross sectional view through a slightly modified form of a one-piece embodiment showing the nut and sleeve assembly upon the fitting prior to swaging of the sleeve to make the nut captive;

FIG. 7 is a cross sectional view through the construction of FIG. 6 following the pre-swaging showing the nut and sleeve in captive position;

FIG. 8 is a cross sectional view illustrating threading of the modification of the fitting and nut assembly of FIGS. 6 and 7 within the port of the part with which it is to be connected;

FIG. 9 is an embodiment of a modification of the invention showing a two-piece nut and sleeve assembly mounted upon the fitting prior to swaging of the sleeve about the unthreaded length of the fitting;

FIG. 10 is a fragmentary sectional view through the embodiment of FIG. 9 showing the fitting threaded into the port, the nut threaded down about the fitting, and the sleeve swaged about the fitting and in sealing position between the fitting and the port;

FIG. 11 is a sectional view through a variant of the modification of the construction of FIG. 9 showing the sleeve prior to swaging;

FIG. 12 is a sectional view through the modification of FIG. 11 showing the sleeve swaged into sealing position following threading of the fitting into the port;

Figure 14:
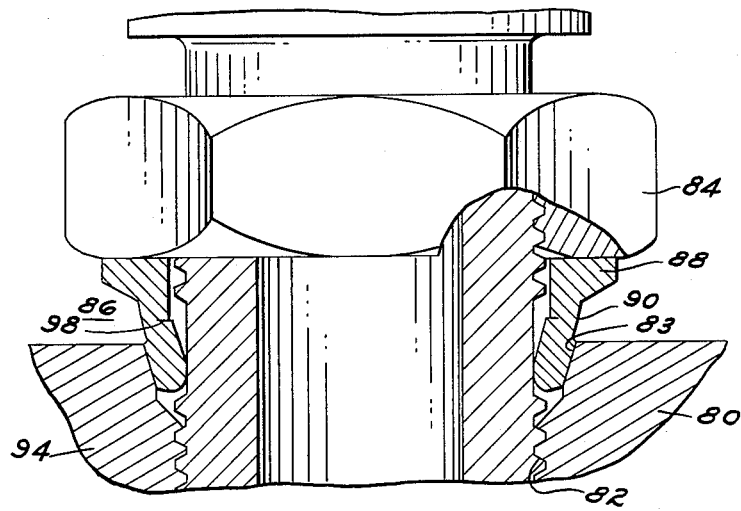
FIG. 14 illustrates the structure of FIG. 13 wherein the sleeve is swaged into sealing engagement about the fitting.

In fluid pressure systems it is important that the couplings between various elements of the system be of such character that tight joints be maintained even under high pressures. It is also important that the couplings should be of such a character that a satisfactory fluid-pressure seal is maintained at all times and notwithstanding repeated coupling and uncoupling of the connections. Furthermore, it is desirable that the couplings be such that they may be quickly and easily tightened or loosened, either to couple together the elements of the system or to uncouple same.

My coupling constitutes an improvement in that it embodies a tubular fitting and nut assembly wherein the nut assembly is captive on the fitting during storage and/or handling of the same prior to use. It is of such a character as to provide a very effective fluid-pressure seal between the fitting and the port within which the fitting is used. It is capable of adjustment to various angular positions, and can be locked at adjusted positions of rotation. My nut assembly is so mounted upon the fitting prior to installation of the fitting within the port that the sleeve portion of the assembly will in all cases be brought into proper sealing engagement with the fitting at the desired point to accomplish a tight seal therewith. My improved fitting assembly is so constructed that if there is leakage within the coupling as the fluid pressure within the coupling goes up, the seal increases in effectiveness.

In the drawings I have shown in the first eight figures an embodiment wherein the sleeve portion of the assembly is formed integrally with the nut portion. In the remaining figures of the drawings, the sleeve and nut assembly is shown as a two-piece one and different groups of figures show different modifications.

Considering first the construction of FIGS. 1–5, such figures illustrate a lock nut 10 formed of suitable steel or the like. Such nut is illustrated as internally threaded at 12. The body of the lock nut portion is exteriorly of a polygonal shape to facilitate its wrench engagement for rotation. Associated with the threaded nut portion is a sleeve or lip portion 14.

This sleeve portion 14 is of reduced thickness as compared with the threaded nut portion. It is disposed axially with respect to the nut as shown in FIG. 1. It is unthreaded. It has a normal internal diameter greater than that of the threaded portion of the nut so it can be passed over the threaded portion of the fitting. It extends forwardly from the nut over the fitting and it is spaced radially from the fitting not only to be moved freely thereover but for another purpose hereinafter described. The sleeve is deformable so that it may be deformed or swaged as hereinafter described. The sleeve is somewhat resilient so that after the pressure of swaging it against the fitting is released, it will spring back slightly away from the fitting for ease of adjustment thereover. The purpose of this characteristic is hereinafter discussed.

The inner end of the sleeve 14 may be swaged inwardly as at 16 as shown in FIG. 2. FIG. 2 shows such inner end pre-swaged slightly inwardly as at 16. This initial inturning may be carried out even before the nut is mounted upon the fitting. After the nut is mounted on the fitting, it is pre-swaged until the lip is brought to the position shown in FIG. 4. At this position the nut and sleeve are held captive upon the fitting. This pre-swaging of the nut may, however, be left entirely until after the nut is mounted upon the fitting, that is, the initial step shown in FIG. 2 may be omitted.

The fitting itself is indicated as 18. It is shown as an angular tubular fitting. The fitting, however, might present any desired shape. As shown, one leg or end portion of the fitting is provided with two externally threaded lengths or portions 20 and 22 spaced apart by an unthreaded length 24. The unthreaded length 24 is here shown as of less external diameter than the threaded lengths 20 and 22. The threaded lengths 20 and 22 are here shown as of the same external diameter. The threaded length 22 is disposed adjacent to the extremity of its leg of the fitting and is termed the inner threaded length. The threaded length 20 is spaced outwardly on the leg from the threaded length 22 by the unthreaded length 24 and is termed the outer threaded length.

When the end of the sleeve is inturned before being mounted upon the fitting as shown in FIG. 2, the nut is then threaded upon the fitting as shown in FIG. 3 to a position in which the inturned lip is disposed opposite the unthreaded portion 24 of the fitting. Such lip is then pre-swaged inwardly toward the fitting and into engagement therewith. Preferably this pre-swaging is carried out by a swaging tool which urges the inner end of the sleeve inwardly until it establishes contact with the unthreaded length of the fitting. Upon removal of the tool the sleeve springs back sufficiently to slightly clear the outer surface of the fitting as shown in FIG. 4. Such spring-back is merely sufficient to clear the fitting so as to permit relative rotation of the fitting within the sleeve. A spring-back of .001" to .002" is sufficient. In FIG. 4 the clearance is exaggerated.

As stated, the sleeve portion of the nut is not only deformable but is slightly resilient. When brought to the shape shown in FIG. 4 the nut is held captive upon the fitting because the inturned inner end 26 of the sleeve exhibits an inside diameter which is less than the outside diameter of the threaded portion 22 of the fitting. The nut therefore may not be accidentally dislodged from the fitting during storage, shipment, or use.

Inasmuch as the threaded length 20 of the fitting has the same diameter as the threaded length 22, the inner end 26 of the sleeve, when pre-swaged as hereinabove described, has an inside diameter less than the external diameter of the threaded portion 20 of the fitting. Therefore, when the fitting is received within the internally threaded port of a part to be coupled therewith, the end 26 of the sleeve will at all times be opposed to the unthreaded portion 24 of the fitting to be brought into sealing engagement therewith as hereinafter described.

My improved nut and fitting assembly is adapted to be received within an internally threaded port of any device or coupling with which connection is to be made as shown in FIGS. 5 and 8. Such an internally threaded port is indicated as 30 in FIG. 8. This port is provided with a beveled or tapered entrance 28. Such beveled face may be on an angle of 30 degrees as illustrated in FIGS. 5 and 8, or it may be on a lesser angle as in FIGS. 15 and 16, which illustrate an angle of 15 degrees. The threaded length 22 of the fitting is threaded into the port to the desired distance. When the fitting has been thus threaded into the port, the fitting may be adjusted to the desired angle to make connection of its end portion 34 with some other part of the system. My fitting is adjustable through a wide arc as, for example, 360 degrees, and continues to function satisfactorily for the liquid seal is not maintained by the threaded engagement of the fitting within the port but by the sealing sleeve and nut assembly.

With the fitting positioned angularly as desired, the nut 10 is threaded down thereover bringing the sleeve at the angle of bend of the end 26 (FIGS. 1–5) continuously circumferentially against the beveled wall 28 of the port. The edge of the inner end 26 of the sleeve is shown in FIG. 4 spaced only slightly from the unthreaded portion of the fitting, having sprung back slightly after the swaging tool was removed. Under the pressure of threading the nut down over the fitting and urging the bend of the inner end of the sleeve against the beveled entrance to the port, the sleeve is not only swaged back against the fitting but the end of the lip is swaged or torqued or urged inwardly continuously circumferentially against the unthreaded length of the fitting.

Such urging of the inturned lip portion 26 toward the fitting is of sufficient force that the edge of the lip abutting the fitting forms a tight seal therewith. In FIGS. 4 and 5, an O-ring gasket 32 is shown. This gasket 32 is compressed between the smooth wall portion 24 of the fitting, the lip portion 26, and the beveled face 28 of the port. The gasket is trapped between the tapered mouth of the port and the fitting and the inturned lip 26 of the nut. Further downward threading of the nut tends to squeeze the gasket downwardly and flatten it and causes it to fill the space between the tapered mouth of the port and the smooth wall 24 of the fitting.

One of the disadvantages of prior art devices which employed an O-ring such as 32 to effectuate the seal between a fitting and a port was that the O-ring was frequently squeezed into the threads. When so squeezed into the threads, the O-ring might be chewed up between the threads of the fitting and the port, with the resulting loss of a tight seal. With my improved assembly any escape of the O-ring upwardly along the smooth wall portion 24 of the fitting and into the threads 12 of the nut and 20 of the fitting is prevented by the lip 26 being urged tightly against the smooth wall of the fitting. The inturned end 26 effectively encloses the space below the lip and bounded thereby and by the smooth wall 24 of the fitting and the tapering mouth of the port.

I have found that the coupling may be made fluid-tight without the use of the O-ring and I prefer to employ the same without an O-ring. If the nut is urged downwardly toward the port with sufficient force, the lip 26 is torqued over the tapered mouth of the port and against the smooth wall 24 of the fitting forming a fluid-tight complete circumferential seal at these points of bearing engagement of the lip with the port and with the fitting.

FIGS. 6, 7, and 8 represent another embodiment of the one-piece assembly. In such figures the part 31 of the system is provided with a threaded port 30. The entrance to this port is by a tapered wall portion 28. The fitting of these figures is an angular fitting having a portion 40 disposed angularly with respect to a portion 42. Portion 40 is externally threaded adjacent to its inner end as at 44 and such is termed the inner threaded length. Portion 40 is also provided with an externally threaded length 46, which is termed the outer threaded length. The threaded length 46 is spaced from the threaded length 44 by an unthreaded length 48. The unthreaded length 48 is of reduced external diameter as compared to the external diameter of the threaded portions 44 and 46.

A nut indicated as 50 is shown as threaded upon the outer threaded portion 46 of the fitting. This nut is provided with a sleeve or lip portion 52 which extends axially from the nut per se, as shown in FIG. 6 and is radially oversize the threaded portion 46 of the fitting. This sleeve portion is deformable and somewhat resilient, as hereinafter specified. It is formed of suitable steel or other satisfactory material.

In FIG. 6 the fitting is shown with the nut assembled thereon at the first stage of such assembly. The end of the nut is shown as abutting a shoulder 54 formed on the fitting, which positions the sleeve. At this position the sleeve portion 52 of the nut overlaps the unthreaded portion 48 of the fitting and the inner end of the sleeve when inturned engages the unthreaded length 48. The second step in the fabrication of the assembly is the pre-swaging of the inner end of the sleeve 52 inwardly toward the unthreaded length 48 of the fitting. Such pre-swaging may be accomplished by practices well known in the art, as with a tool, as heretofore described. The inner end of the sleeve is swaged inwardly until the inner beveled face 56 is brought into contact with the unthreaded length 48 of the fitting. It will be noted that the inner edge of the inner end of the sleeve is inwardly beveled as at 56 on an angle which corresponds generally as to angle with the beveled angle 28 of the entrance to the threaded port 30 of the device 31 heretofore described. The outer margin of the inner end of the sleeve is also provided with an outwardly beveled face 58, as shown in FIG. 6, and such face 58 forms facial contact with the beveled face 28 of the port.

When the sleeve has been swaged inwardly, as hereinabove described, until its inner beveled face 56 is brought into contact with the unthreaded length 48 of the fitting, it will be noted that such beveled face 56 is substantially parallel to the face of the unthreaded length 48 of the fitting and therefore establishes substantially flat continuous facial contact therewith. The resiliency in the sleeve is such that when the swaging tool is withdrawn, the tip portion of the sleeve 52 springs slightly away from the unthreaded length of the fitting. The clearance is merely such as to permit free relative rotation of the nut and sleeve about the fitting as hereinabove described. Such clearance is exaggerated in FIG. 7 as it is in FIG. 4.

It is generally in the form shown in FIG. 7 that the fitting and nut assembly is sold. In such form the nut is captive on the fitting as is apparent. It is captive because the inner end of the sleeve has been swaged inwardly to such an extent that its inside diameter is less than the outside diameter of the threaded lengths 44 and 46 of the fitting.

To mount the fitting in a port such as shown at 30 in FIG. 8, the inner threaded length 44 of the fitting is threaded into the threaded part of the port. The nut is then threaded downwardly on the outer threaded length 46 of the fitting as there shown. When connection of the threaded length 44 of the fitting is established satisfactorily within the port and the nut threaded down to establish contact of its lip with the beveled wall 28 of the port, the nut may be backed off slightly so that the angular fitting can be adjusted to any angle at which its end portion 42 may be lined up with a suitable connection or the like. As heretofore stated, such angle of adjustment is large.

Following such angular adjustment the nut may then be threaded down to bring the inner end of the sleeve 52 against the tapered wall 28. Such sleeve so engages the tapered wall that pressure is exerted thereupon at different and varying angles as distinguished from earlier fittings which exerted a pressure upon the wall of the ported part axially of the port. Continued threading of the nut will urge the beveled face 56 of the lip 52 continuously circumferentially inwardly toward the unthreaded length of the fitting as shown in FIG. 8. Such face 56 will form a tight seal against the face of the unthreaded length of the fitting throughout a substantial surface area and throughout its entire circumference. The engagement of face 56 with the fitting is such that repeated sealing engagements may be accomplished without damage to the fitting. In other words, such repeated engagements do not mar or undesirably abrade the surface of the fitting.

Any fluid which may escape under high pressure through the threads 30 and 44 will be trapped within the space below the lip 52 and between the beveled wall 28 and the unthreaded length of the fitting. Such fluid pressure will tend to urge the lip more tightly against the fitting wedging the same which extends between the beveled entrance to the port and the unthreaded length of the fitting more tightly therebetween and thereby increasing the effectiveness of the seal. This is of substantial importance in providing an effective seal under widely varying pressures.

In the remaining figures of the drawing, a two-piece nut and sleeve or lip assembly is shown on the fitting. In such figures the nut is shown as a separate piece from the sealing sleeve portion. It will be noted that in the first eight figures hereinabove described as in the figures hereinafter described, the sleeve when swaged about the fitting is outwardly open and in cross section somewhat cup-shaped.

FIGS. 9-12 illustrate one modification of the two-piece assembly. In these figures the fitting is indicated as 18 as it was in the first eight figures of the drawing. It is also shown as of an angular shape though it might be a straight fitting. One leg portion is indicated as having two externally threaded lengths or portions 20 and 22 spaced apart by an unthreaded length 24. The unthreaded length 24 is shown as of reduced external diameter as compared with the inner and outer threaded lengths 20 and 22, respectively, as was the case with the first eight figures of the drawing. The threaded lengths 20 and 22 are also here illustrated as of the same external diameter.

The nut is indicated as 60. It is separate from the sleeve portion 62. The nut 60 and the sleeve 62 constitute the functioning equivalent of the one-piece annular sealing means in the first eight figures of the drawing. The sleeve 62 is shown as mounted upon the fitting between the nut 60 and the member 64, which member has an internally threaded port 66 provided with a beveled tapered entrance 68.

The sleeve 62 shown in FIGS. 9 and 10 has an internal diameter adjacent to the nut 60 sufficiently oversize the fitting to clear the threads 22. The inner end of the sleeve 62 is provided with an external beveled face 70 which is opposed to the beveled face 68 of the port and is adapted to be urged into engagement therewith by threading down of the nut 60 upon the fitting. Such inner end of the sleeve is also provided with an internal beveled face portion 72 directly opposed to the unthreaded length 24 of the fitting. The inner end portion of the sleeve is preferably initially pre-swaged with a tool or the like as heretofore described in connection with the construction of FIGS. 1-8 so that the sleeve and nut are held captive on the fitting.

As also heretofore described in connection with other figures, this sleeve 62 is made of deformable resilient metal, such as a suitable steel, so that after being pre-swaged down against the unthreaded length 24 of the fitting, the lip will spring back, when the pressure of the swaging tool is released. When the fitting is threaded into the threaded portion 66 of the port and the nut 60 is threaded down upon the fitting, the inner end portion of the sleeve is swaged over the beveled entrance 68 of the port and the inner beveled face 72 of the sleeve is brought into continuous circumferential engagement with the unthreaded length of the fitting. The outer beveled face 70 is wedged against the beveled entrance to the port.

It will be observed that the situation is similar to that just described in connection with the construction shown in the first eight figures of the drawings. Continuous circumferential sealing engagement is provided by the inner end portion of the sleeve with the beveled entrance to the port and about the unthreaded length of the fitting. If liquid leaks under pressure into the space between the inturned end portion of the sleeve and the beveled entrance of the port and the unthreaded length of the fitting, the pressure of such liquid against the inturned sleeve portion wedges the same more tightly into sealing engagement and increases the effectiveness of the seal.

The construction of FIGS. 11 and 12 represents a slight modification of the nut and sealing sleeve as compared with the construction of FIGS. 9 and 10. In FIGS. 11 and 12 the nut is indicated as 60 and it has a recessed or counterbored inner face within which the outer end of the sleeve 76 is received and seated. This sleeve 76 differs slightly from the sleeve 62 shown in FIGS. 9 and 10 but functions in a similar manner. The inner end of the sleeve 76 is provided with an inturned portion 78 which is inturned at an angle toward the unthreaded length 24 of the fitting. Such sleeve 76 is formed of metal of a similar character to that of the sleeve in FIGS. 9 and 10 and is similarly deformable and resilient.

The inturned portion 78 of the sleeve 76 is preferably pre-swaged toward the unthreaded length of the fitting and to an internal diameter less than the external diameters of the threaded lengths 20 and 22 of the fitting so that the nut and sleeve are held captive upon the fitting. FIG. 11 shows the nut and sleeve mounted upon the fitting but prior to this pre-swaging. FIG. 12 shows the sleeve following the pre-swaging and after it has also been subjected to the pressure of the nut thereupon, which pressure has further swaged the end of the sleeve inwardly about the unthreaded length of the fitting, sealing the same against the beveled entrance to the port and about the unthreaded length of the fitting.

The response of the inturned end portion of the sleeve to liquid pressure due to leakage of liquid by the threads 66 and 20, as heretofore described in connection with hereinabove described modifications, functions to increase the effectiveness of the sealing engagement of the inturned end between the fitting and the beveled entrance to the port. It will clearly appear that pressure against the underside of the inturned end portion of the sleeve, such as would result from leakage of liquid, would wedge the same more tightly into position between the fitting and the beveled entrance to the port.

Figure 16:
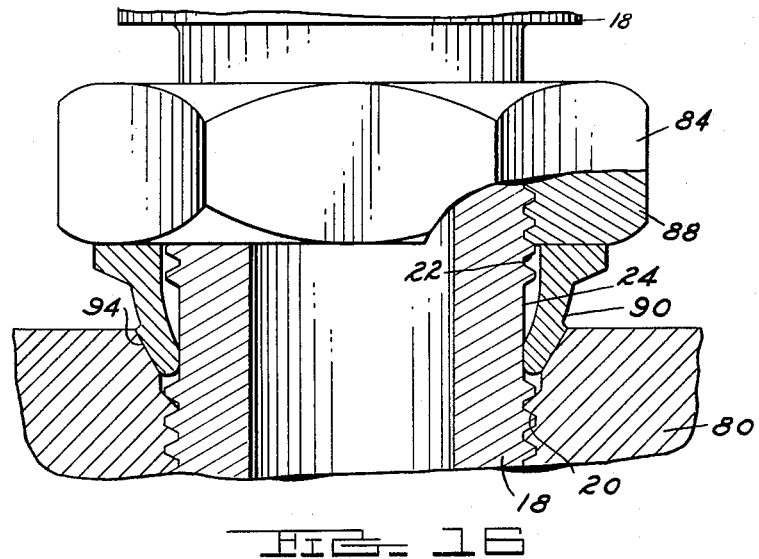
FIG. 16 illustrates the structure of FIG. 15 showing the sleeve swaged into sealing engagement about the fitting.
Figure 17:
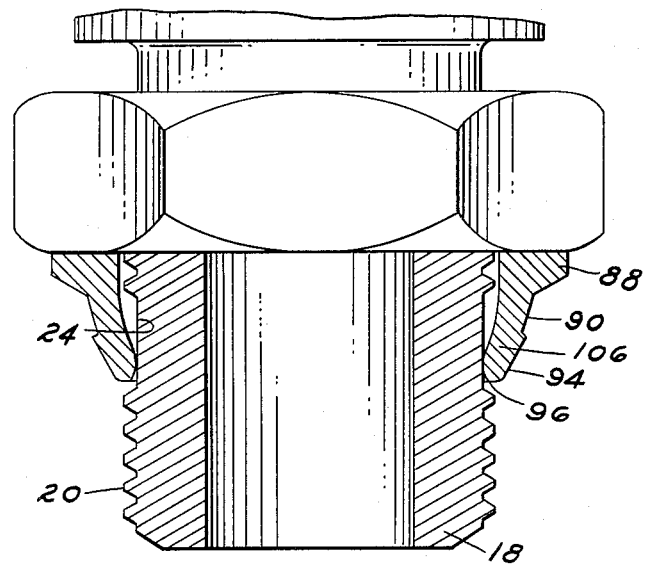
FIG. 17 is a sectional view through the structure shown in FIG. 15 following pre-swaging of the sleeve but prior to swaging thereof into sealing position between the beveled wall of the port and the unthreaded length of the fitting.
Figure 18:
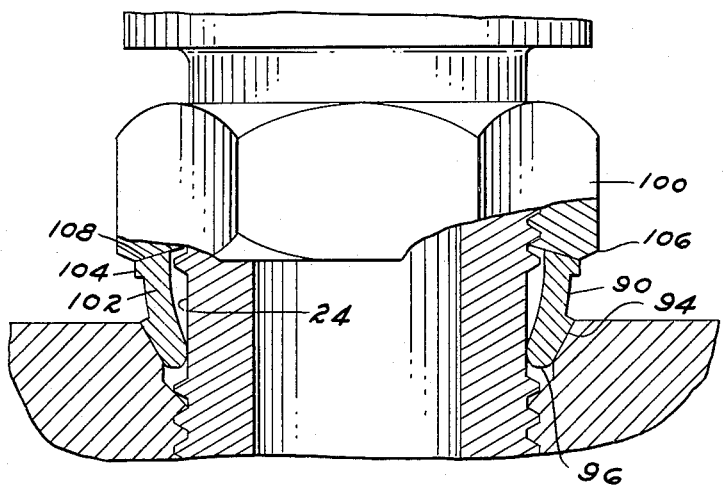
FIG. 18 is a cross sectional view through a fitting and separate nut and sleeve assembly somewhat modified as compared with the structure shown in FIGS. 15–17.

FIGS. 13–19 illustrate another modification of this sleeve and nut assembly. In these figures the fitting is again indicated at 18, its inner threaded length as 20, its outer threaded length as 22, and its unthreaded length as 24. The member provided with the port is indicated as 80, the threaded port as 82, the beveled entrance to the port as 83, and the nut is indicated as 84. The beveled entrance 83 to the threaded port 82 is shown in FIGS. 14 and 18 as beveled to a lesser angle than in the structure shown in the earlier figures.

The sleeve in this modification of FIGS. 13–19 is indicated as 86. Such sleeve is provided with a relatively heavy outer end portion or base portion 88. Intermediate between this heavy outer end portion 88 and the inner end of the sleeve, it is weakened as at 90 so that the sleeve end can be more readily inturned or swaged toward the unthreaded length of the fitting as shown in FIGS. 14, 16, 17, and 18. The inner end of the sleeve is provided at its extremity with an arcuate inner face 92 adapted to be urged against the unthreaded length 24 of the fitting. The outer face of the inner end of the sleeve, which is adapted to bear against the beveled entrance to the port, is shown as flat as at 94. There is a beveled face 96 extending between the arcuate inner face 92 and the flat outer face 94.

Such sleeve can be pre-swaged to be held captive upon the fitting as heretofore described. When the fitting has been threaded into the port and the nut 84 threaded down against the sleeve, urging its inner end against the beveled entrance to the port, the inner end of the sleeve is further swaged inwardly against the unthreaded length of the fitting forming a tight seal thereagainst, all as hereinabove set forth. It will be noted that it is arcuate face 92 of the sleeve that is constricted about the unthreaded length 24. Furthermore, as hereinabove set forth, in case of leakage of liquid into the space below the inwardly swaged inner end of the sleeve and the beveled entrance to the port and the fitting, such liquid will urge the inner end of the sleeve more tightly between the fitting and the beveled entrance to the port, thereby increasing the effectiveness of the seal. The heavy base 88 of the sleeve holds the same against radial expansion or distortion during the swaging of the inner end of the sleeve inwardly toward the fitting.

Figure 13:
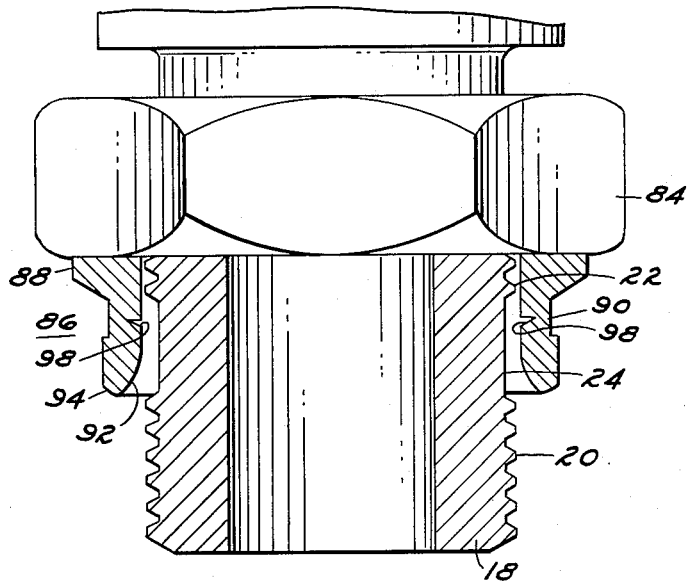
FIG. 13 is a cross sectional view through another modified form of a two-piece nut and sleeve assembly mounted upon a fitting prior to swaging of the sleeve.

In FIGS. 13 and 14 a construction is shown wherein, in addition to weakening the sleeve as hereinabove described, it is further weakened intermediate its ends as at 98 and for the same purpose.

Figure 15:
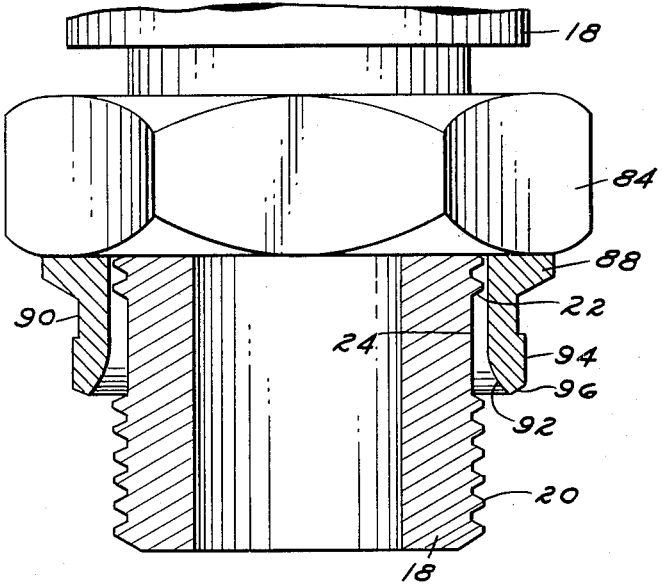
FIG. 15 is an enlarged sectional view through another modified form of two-piece nut and sleeve assembly prior to swaging of the sleeve.
Figure 19:
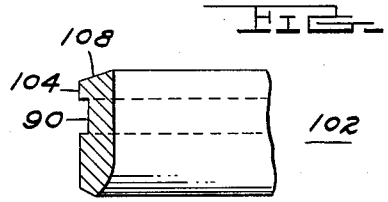
FIG. 19 is a cross sectional view through a fragment of a sleeve as shown in FIG. 18 prior to swaging of the sleeve.

In FIGS. 18 and 19, the construction is similar to that of FIGS. 15–17. The fitting is indicated as 18 and provided with an inner threaded length 20, an outer threaded length 22, and an unthreaded length 24 separating the two threaded lengths from each other. This unthreaded length is of less diameter than the diameters of the threaded lengths, all as specified in connection with the earlier figures of the drawing. The nut is indicated as 100, the sleeve as 102, and the outer end or base of the sleeve is indicated as 104. The inner end of the sleeve has an inner arcuate face 92 opposed to the unthreaded length of the fitting and has a beveled outer face opposed to the beveled entrance to the port. The sleeve is circumferentially recessed intermediate its ends as at 90 as heretofore described.

FIG. 19 illustrates such sleeve before it has been pre-swaged. FIG. 18 illustrates the sleeve following pre-swaging with the inner end of the sleeve swaged against the unthreaded length of the fitting holding the sleeve and nut captive upon the fitting. In FIG. 18 the sleeve is shown as swaged to its sealing position, and with the fitting threaded into the port and the nut threaded down upon the fitting urging the inner end of the sleeve against the beveled entrance to the threaded port and constricting the same about the unthreaded length of the fitting.

FIGS. 18 and 19 are similar to the modification shown in FIGS. 11–12 in that the inner end of the nut 100 is shown as recessed or undercut on an acute angle as at 106 and the outer end face of the sleeve is beveled as at 108 to seat against such recessed face of the nut and the sleeve is held thereby against radial expansion at such end when the sleeve is swaged inwardly about the unthreaded length of the fitting, and is also so held under high liquid pressure brought to bear against the inner end of the sleeve.

This seating of the outer end of the sleeve against this angular recessed face 106 of the nut and the holding of the outer end of the sleeve thereby against expansion permits the use of a sleeve formed as shown in FIGS. 18 and 19. It will be noted that the sleeve shown in FIGS. 18 and 19 does not have the heavy base portion 88 shown in the sleeve of FIGS. 13–17.

It will be noted that the constructions shown in the several figures of the drawings are generally similar and function in a generally similar manner. Whether the sleeve and nut assembly is formed in one piece as shown in FIGS. 1–8 of the drawings or whether it is formed in two pieces as shown in FIGS. 9–19 of the drawings, the functioning is substantially similar. Preferably the inner end of the sleeve is pre-swaged through employment of a tool thereagainst and prior to threading of the fitting into a threaded port. This pre-swaging deforms the sleeve into a generally cup-shaped annulus which opens outwardly toward the nut.

During the pre-swaging operation, the inner end of the sleeve is constricted about the unthreaded length of the fitting until it is brought into engagement therewith. When the swaging tool is withdrawn, such end, because of the resiliency of the sleeve, springs back away from the fitting so as to permit free relative rotation of the fitting and sleeve. When the fitting is threaded into a threaded port provided within a beveled entrance and positioned as desired, which may include backing off of the fitting and angular adjustment with respect to the ported member, the nut is then tightened down against the sleeve. The nut is rotated to urge the end of the sleeve against the beveled entrance of the port.

This urging of the sleeve against the beveled entrance to the threaded port torques the inner face of the inner end of the sleeve, whether of the arcuate facial shape or a flat facial shape, both of which are shown in the drawings, against the unthreaded length of the fitting. This torquing of the nut down against the sleeve is continued until a tight seal is formed by the inner end portion of the sleeve both with the unthreaded length of the fitting and with the beveled entrance to the port. It has been found that the effectiveness of this seal is increased if there is leakage of liquid under high pressure between the threaded port and the threaded fitting because such liquid pressure urges the inner end portion of the sleeve more tightly between the fitting and the beveled entrance to the port.

What I claim is:

1. A fluid pressure coupling for attachment to a member having an internally threaded port provided with an outwardly beveled unthreaded entrance comprising, in combination, a tubular fitting having one end portion provided with two externally threaded lengths, one being an inner threaded length adjacent to the end of the fitting adapted to be threadedly received within the threaded port of the member, and the other being an outer threaded length spaced outwardly from said inner threaded length by an unthreaded length, said unthreaded length having an external diameter less than the external diameter of the inner threaded length, annular sealing means encircling the fitting and comprising a nut portion threadedly coupled with the outer threaded length of the fitting and a resistingly deformable resilient continuous metal sleeve portion encircling the unthreaded length of the fitting between the nut portion and the beveled entrance to the port when the inner threaded length of the fitting is threadedly received within the port, said sleeve portion being in the form of an axially outwardly opening substantially convex lip forming in cross section substantially a quadrant of a circle, the inner end of the lip substantially engaging and fitting the said unthreaded length and the outer end of the lip extending substantially parallel to the axis of the fitting, the inner end of said lip at the point of substantial engagement with the unthreaded length being of less internal diameter than the external diameter of the inner threaded length of the fitting, the external surface of said lip opposite said inner end being radially opposed to said beveled entrance to the port and adapted to bear continuously circumferentially against the said beveled entrance to be resiliently constricted urging the said inner end continuously circumferentially against the said unthreaded length of the fitting when the external surface of the lip is urged against and swaged inwardly by the beveled entrance to the port by pressure thereupon by the nut, the radially inner surface of the lip being radially spaced from the fitting from the point of substantial engagement of said inner end with said unthreaded length to said outer end and having an internal diameter at said outer end and immediately adjacent to the nut greater than the external diameter of the outer threaded length of the fitting, the external surface of the inner end portion of said lip being spaced from the beveled entrance to the port, whereby fluid pressure against the external surface of the inner end portion of said lip tends to wedge it more tightly between the fitting and the beveled entrance to the port.

2. A fluid pressure coupling for attachment to a member having an internally threaded port provided with an outwardly beveled unthreaded entrance constituting a radially inwardly camming surface comprising, in combination: a tubular fitting having an externally threaded end adapted to be threadedly received within the threaded port of the member, said fitting having an unthreaded length disposed outwardly adjacent the threaded end and opposite said beveled entrance when the threaded end is threadedly received within the port, said unthreaded length having an external diameter substantially equal to the root diameter of the threaded end, annular sealing means on the fitting comprising a continuous metal sleeve encircling the unthreaded length and having an outer generally cylindrical portion with an internal surface of a diameter exceeding the crest diameter of said threaded end and a contiguous inner end portion having substantially frusto-conical radially inner and outer surfaces tapering axially inwardly to said unthreaded length and being substantially entirely within the beveled entrance of the port when the fitting is threadedly coupled in the port and formed of resistingly deformable resilient metal having the capability of being radially contracted within the port against said unthreaded length as the sleeve is urged into the port and against said radially inwardly camming surface and springing radially outwardly away from said unthreaded length upon retraction of the sleeve from the port, means on said inner end portion for sealingly engaging said unthreaded length outwardly from the threads of said threaded end when said inner end portion is radially contracted in the port and for preventing cutting or substantial deformation of said unthreaded length with such means having an internal diameter less than the crest diameter of said threaded end and sufficiently greater than the diameter of the unthreaded length when the fitting is disengaged from the port that the sleeve is shiftable upon the unthreaded length, said radially inner surface of the inner end portion of the sleeve from said last mentioned means tapering radially outwardly from said unthreaded portion and within the port to said internal surface of the outer generally cylindrical portion when the fitting is sealed in the port, means on said fitting at the outer end of the sleeve for substantially preventing radially outward movement of the entire outer end portion of the sleeve outwardly of the port and for urging the sleeve inwardly of the port to seal against said beveled entrance and causing contraction of said inner end portion substantially entirely within the port and urging of said means at the inner end portion of the sleeve into sealing engagement with said unthreaded length.

3. The invention as defined in claim 2 characterized in that said inner end portion of the sleeve prior to mounting the sleeve on the fitting is substantially co-cylindrical with the outer end portion of the sleeve with the internal diameter of such inner end portion sufficient to allow axial reception of the sleeve over said threaded end to position the sleeve about said unthreaded length, with said inner end portion of the sleeve prior to threadedly coupling the sleeve in the port being contracted about the unthreaded length of the fitting to said frusto-conical shape to provide said means on the inner end portion with an internal diameter less than the crest diameter of said threaded end portion.

4. The invention as claimed in claim 2 characterized in that said means on the fitting at the outer end of the sleeve comprises, in combination: an outer threaded length on the fitting spaced from said threaded end by said unthreaded length, and a nutlike member threadedly mounted on the outer threaded length.

5. The invention defined by claim 4 characterized in that said nutlike member and sleeve are integral and formed of one piece of material.

6. The invention defined by claim 4 characterized in that said nutlike member and sleeve are separate members with the nut rotatable independently of the sleeve to urge the sleeve to sealing engagement with the fitting and port.

7. The invention as defined by claim 2 characterized in that said means on the fitting at the outer end of the sleeve comprises, in combination: an outer threaded length spaced from said threaded end by said unthreaded length, a nut threadedly mounted on said outer threaded length, and a substantially radially extending flange on the outer end of the sleeve integral with the sleeve and bearing against the nut.

8. The invention as defined by claim 4 characterized in that said nutlike member is provided with a recess opening toward the outer end portion of the sleeve and such outer end portion is received within such recess to trap the outer end portion of the sleeve against outward radial expansion.

9. The invention as defined in claim 2 characterized in that said means on the inner end portion of the sleeve comprises an internal circumferential face of the inner end portion of the sleeve formed on a radius to bear against the unthreaded length of the fitting.

10. The invention as defined in claim 2 characterized in that said means on the inner end portion of the sleeve comprises an internal circumferential face of the inner end portion of the sleeve substantially parallel to the surface of the unthreaded length when contracted into engagement with such unthreaded length.

11. The invention as defined by claim 2 characterized in that said sleeve at substantially the point of contiguity of the inner and outer portions thereof having a weakened circumferential portion facilitating contraction of the inner end portion of the sleeve.

12. The invention as defined by claim 2 characterized in that a non-metallic resilient ring encircles the unthreaded length of the fitting and is compressed between said inner end portion and said unthreaded length.

References Cited in the file of this patent

UNITED STATES PATENTS

| | | |
|---|---|---|
| 1,015,843 | Schmidt | Jan. 30, 1912 |
| 1,030,237 | Hall | June 18, 1912 |
| 1,063,926 | Schuerman | June 3, 1913 |
| 1,251,676 | McCaffray | Jan. 1, 1918 |
| 1,523,146 | Stevenson | Jan. 13, 1925 |
| 1,529,734 | Barbour | Mar. 17, 1925 |
| 1,840,312 | Dunmire | Jan. 12, 1932 |
| 1,899,119 | Singer | Feb. 28, 1933 |
| 1,969,142 | McIntyre | Aug. 7, 1934 |
| 1,984,887 | Mackert | Dec. 18, 1934 |
| 2,069,177 | Craver | Jan. 26, 1937 |
| 2,225,208 | Crickmer | Dec. 17, 1940 |
| 2,342,425 | Parker | Feb. 22, 1944 |
| 2,343,235 | Bashart | Feb. 29, 1944 |
| 2,343,922 | Parker | Mar. 14, 1944 |
| 2,373,253 | Martin | Apr. 10, 1945 |
| 2,450,170 | Smith | Sept. 28, 1948 |
| 2,466,057 | Somma | Apr. 5, 1949 |
| 2,503,826 | Lamont | Apr. 11, 1950 |
| 2,541,141 | Woodling | Feb. 13, 1951 |
| 2,704,676 | Harding | Mar. 22, 1955 |
| 2,826,438 | Woodling | Mar. 11, 1958 |

FOREIGN PATENTS

| | | |
|---|---|---|
| 22,894 | Great Britain | Oct. 10, 1913 |
| 309,529 | Italy | July 8, 1933 |
| 198,232 | Switzerland | June 15, 1938 |

UNITED STATES PATENT OFFICE
CERTIFICATE OF CORRECTION

Patent No. 3,003,795                                  October 10, 1961

Gilbert T. Lyon

It is hereby certified that error appears in the above numbered patent requiring correction and that the said Letters Patent should read as corrected below.

In the drawings, the following corrections are made:

> In Fig. 13 reference numeral "94" should be -- 96 --.
> In Fig. 14 reference numeral "94" should be deleted.
> In Fig. 16 reference numeral "88" should have its lead line redirected to indicate the upper end of the sleeve as shown in Fig. 15.
> In Fig. 17 reference numeral "106" should be deleted.
> In Fig. 18 reference numeral "106" should have its lead line redirected to indicate the undercut bevel at the thread mouth of nut 100.

Signed and sealed this 12th day of May 1964.

(SEAL)
Attest:

ERNEST W. SWIDER                             EDWARD J. BRENNER
Attesting Officer                              Commissioner of Patents